(12) United States Patent
Saint Clair et al.

(10) Patent No.: US 8,976,287 B1
(45) Date of Patent: Mar. 10, 2015

(54) SCANNING ZOOM SYSTEM

(75) Inventors: Jonathan M. Saint Clair, Seattle, WA (US); David C. Soreide, Seattle, WA (US); Ordie Dean Butterfield, Bonney Lake, WA (US)

(73) Assignee: The Boeing Company, Chicago, IL (US)

(*) Notice: Subject to any disclaimer, the term of this patent is extended or adjusted under 35 U.S.C. 154(b) by 409 days.

(21) Appl. No.: 13/438,162

(22) Filed: Apr. 3, 2012

(51) Int. Cl.
*G03B 13/00* (2006.01)
*H04N 5/225* (2006.01)

(52) U.S. Cl.
USPC .......................................................... 348/347

(58) Field of Classification Search
CPC .......... H04N 5/23212; H04N 5/23209; H04N 5/23296; H04N 5/2254; G02B 7/102
USPC .......................................................... 348/347
See application file for complete search history.

(56) References Cited

U.S. PATENT DOCUMENTS

| | | |
|---|---|---|
| 5,107,369 A | 4/1992 | Hendrickson et al. |
| 2012/0274811 A1* | 11/2012 | Bakin ........................... 348/239 |
| 2013/0057749 A1* | 3/2013 | Hiasa et al. .................. 348/340 |

OTHER PUBLICATIONS

Carrano et al., "Speckle imaging over horizontal paths", Proceedings of SPIE vol. 4825, Copyright 2002, pp. 109-120.
Cheeseman et al., "Subpixel Resolution from Multiple Images", NASA Technical Report FIA-94-12, Dec. 1994, pp. 2.
Dolne et al., "Wavefront Sensing, Imaging, and Image Enhancement: introduction to the feature issue", Applied Optics, vol. 48 No. 1, Jan. 1, 2009, pp. 30-34.
MacDonald et al., "Recent laser radar field test results gathered with the Rapid Optical Beam Steering (ROBS) system", Proceedings of SPIE vol. 2748, Copyright 1996, pp. 325-332.
Huimin et al., "Scannerless laser three dimensional imaging method", Proceedings of SPIE vol. 3558, Copyright 1998, pp. 49-52.
Zhang et al., "A novel micro zoom system design with liquid lens", Proceedings of SPIE vol. 7156, Copyright 2008, 9 pages.

* cited by examiner

*Primary Examiner* — Twyler Haskins
*Assistant Examiner* — Quang Le
(74) *Attorney, Agent, or Firm* — Yee & Associates, P.C.

(57) ABSTRACT

A method and apparatus comprising a sensor array, a primary lens, and a moveable lens array. The sensor array comprises sensors arranged in an array in which the sensors are configured to generate image data. The primary lens is configured to direct light towards the sensor array. The moveable lens array comprises a number of lenses. The moveable lens array is moveable to a plurality of positions between the primary lens and the sensor array. Each lens in the number of lenses is configured to focus the light.

14 Claims, 7 Drawing Sheets

SCANNING ZOOM SYSTEM

BACKGROUND INFORMATION

1. Field

The present disclosure relates generally to imaging systems and, in particular, to zoom functions in imaging systems. Still more particularly, the present disclosure relates to changing fields of view in cameras.

2. Background

Imaging systems often have different fields of view. A field of view is the extent to which an imaging system can generate data about the environment around the imaging system. For example, a wide field of view may be used to obtain an image of an entire city. In some cases, it is desirable to generate images about a portion of the city or an object in the city. When objects are magnified and more detail is obtained about those objects, the field of view is often narrower.

In other words, a focal length change is employed to enlarge the objects and obtain more detail. With this focal length change, the field of view becomes narrower. This focal length change may also be referred to as a zoom function.

This zoom function is performed optically, electronically, or some combination of the two. The electronic method is also referred to as a digital zoom. This type of zoom decreases the apparent field of view of the image. A digital zoom emulates a focal length change. A digital zoom may be accomplished by cropping the image down to an area with the same aspect ratio as the original. Interpolation is often performed. This interpolation may cause a loss of detail in the narrower field of view. In other words, the objects in the portion with the narrower field of view may appear larger but may not have as much detail as desired.

With an optical zoom, a smaller field of view is provided through a lens system. This field of view also provides for increased detail about objects within the narrower field of view. This type of zoom is more desirable than a digital zoom. However, an optical zoom may require hardware changes from the current lens system providing the wider field of view to a lens system that provides the desired magnification of the objects.

When moving from a wider field of view to a narrower field of view, a first housing containing a lens system for the wider field of view is switched out for a second housing containing a lens system with a narrower field of view. In other words, the lens system for the wider field of view may be removed, and the lens system for the narrower field of view may be put in place of the lens system for the wider field of view in an imaging system, such as the body of a camera. Alternatively, a single zoom lens may be employed. With either option, the amount of weight and the size of the camera system may be greater than desired. Further, the power requirements for operating a dual lens system may be greater than desired. Moreover, these options limit an operator to a single, narrowed field of view.

Therefore, it would be desirable to have a method and apparatus that takes into account at least some of the issues discussed above as well as other possible issues.

SUMMARY

In one illustrative embodiment, an apparatus comprises a sensor array, a primary lens, and a moveable lens array. The sensor array comprises sensors arranged in an array in which the sensors are configured to generate image data. The primary lens is configured to direct light towards the sensor array. The moveable lens array comprises a number of lenses. The moveable lens array is moveable to a plurality of positions between the primary lens and the sensor array. Each lens in the number of lenses is configured to focus light.

In another illustrative embodiment, an imaging system comprises a sensor array, a primary lens, a moveable lens array, and a movement system. The sensor array comprises sensors arranged in an array in which the sensors are configured to generate image data. The primary lens is configured to direct light towards the sensor array. The moveable lens array comprises a number of lenses. The moveable lens array is moveable between the primary lens and the sensor array. Each lens in the number of lenses is configured to focus light. The movement system is connected to the moveable lens array. The movement system is configured to move the moveable lens array to a first position along an optical axis relative to an image plane such that light reaching a portion of the sensors is not focused by the moveable lens array. The movement system is further configured to move the moveable lens array to a second position along the optical axis relative to the image plane such that the light reaching the portion of the sensors is focused by the moveable lens array. The movement system is further configured to move the moveable lens array to a number of positions in a direction transverse to the optical axis of the sensor array.

In yet another illustrative embodiment, a method for managing light reaching a sensor array is present. A portion of a first field of view is identified. A moveable lens array is moved relative to the sensor array to a location between a primary lens and the sensor array such that a lens in the moveable lens array focuses light for the first field of view to form a second field of view.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that using a single lens system that provides multiple fields of view may be more desirable than switching out lens systems to obtain a desired field of view. With a single lens system, the weight, size, power usage, or some combination thereof may be reduced.

Thus, the illustrative embodiments provide a method and apparatus for an imaging system. In one illustrative embodiment, an apparatus comprises a sensor array, a primary lens, and a moveable lens array. The sensor array is comprised of sensors arranged in an array. The sensors are configured to generate image data. The primary lens is configured to direct light toward the sensor array. The moveable lens array is comprised of a plurality of lenses. The moveable lens array is moveable to a plurality of positions between the primary lens and the sensor array. Each lens in the plurality of lenses is configured to focus light onto the sensor array.

Figure 1:
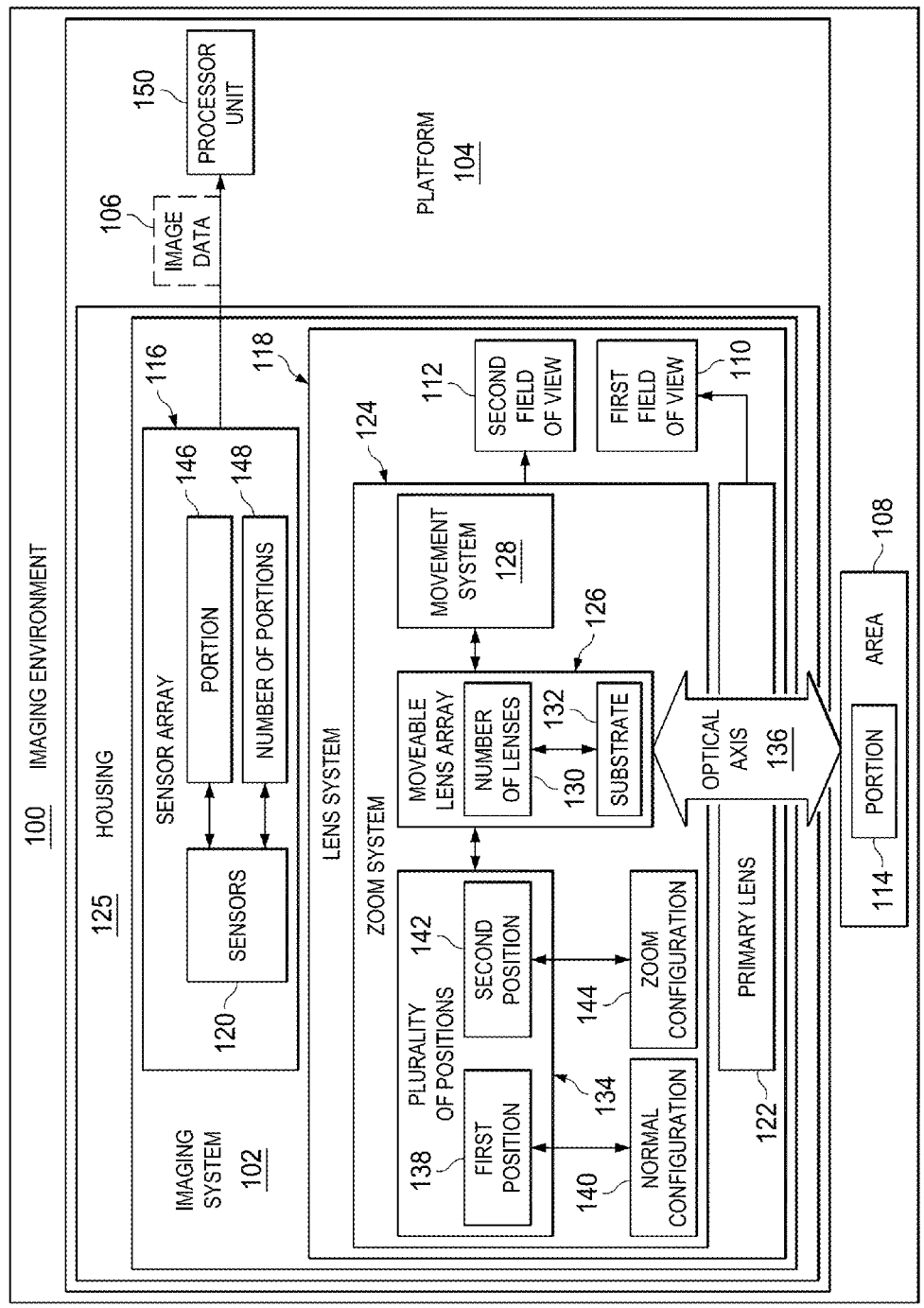
FIG. 1 is an illustration of a block diagram of an imaging environment in accordance with an illustrative embodiment.

With reference now to the figures and, in particular, with reference to FIG. 1, an illustration of a block diagram of an imaging environment is depicted in accordance with an illustrative embodiment. In this illustrative example, imaging environment 100 includes imaging system 102. Imaging system 102 is associated with platform 104.

When one component is "associated" with another component, the association is a physical association in these depicted examples. For example, a first component, such as imaging system 102, may be considered to be associated with a second component, such as platform 104, by being secured to the second component, held by the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, platform 104 may take a number of different forms. For example, platform 104 may be a satellite.

In these illustrative examples, imaging system 102 is configured to generate image data 106 about area 108. Image data 106 may be data for a still image, a video, or other types of image data. Area 108 may be any area of interest. For example, without limitation, area 108 may be a city, a field, a mountain side, a portion of the sky, or some other suitable area.

As depicted, imaging system 102 is configured to provide first field of view 110 and second field of view 112 of area 108. First field of view 110 is greater in size than second field of view 112. For example, when additional detail is desired about portion 114 of area 108, imaging system 102 may use second field of view 112 to obtain the additional detail about portion 114 of area 108.

In these illustrative examples, first field of view 110 may provide image data 106 about area 108 in the form of a city. In some cases, additional detail about portion 114 of the city may be desired. For example, portion 114 may include, without limitation, a building, a city block, an intersection, a car, a person, or some other object or objects in area 108.

In these illustrative examples, imaging system 102 comprises sensor array 116 and lens system 118. Sensor array 116 is comprised of sensors 120. Sensors 120 are arranged in a grid or some other arrangement. Each sensor in sensors 120 may correspond to a pixel.

As depicted, lens system 118 comprises primary lens 122 and zoom system 124. Lens system 118 may be located in housing 125. Primary lens 122 is configured to provide first field of view 110. Zoom system 124 is configured to provide second field of view 112. In these illustrative examples, primary lens 122 and zoom system 124 are integrated as a single lens system in lens system 118 rather than as separate lens systems. For example, primary lens 122 and zoom system 124 may be located in the same housing for lens system 118.

As depicted, zoom system 124 comprises moveable lens array 126 and movement system 128. Moveable lens array 126 is comprised of number of lenses 130 and substrate 132. As used herein, a "number of" items means one or more items. For example, number of lenses 130 is one or more lenses. A lens in number of lenses 130 is configured to focus light passing through the lens.

Movement system 128 is configured to move moveable lens array 126 to plurality of positions 134. Plurality of positions 134 is a plurality of positions between primary lens 122 and sensor array 116.

In one illustrative example, movement system 128 is configured to move moveable lens array 126 along optical axis 136. Optical axis 136 is a line through which light propagates from primary lens 122 to sensor array 116.

For example, movement system 128 may move moveable lens array 126 to first position 138 along optical axis 136. In these illustrative examples, first position 138 is a position for normal configuration 140. In normal configuration 140, number of lenses 130 does not have a noticeable effect on light passing from primary lens 122 to sensor array 116. In normal configuration 140, imaging system 102 has first field of view 110. In other words, the light is not focused by number of lenses 130 on sensor array 116 such that objects are magnified in the image data generated by sensor array 116. In other words, the focal length is substantially negligible in this configuration.

Movement system 128 also may move moveable lens array 126 to second position 142 along optical axis 136. The movement system also may move primary lens 122 along optical axis 136 such that objects magnified in the light reaching sensor array 116 are in focus on sensor array 116. In these illustrative examples, second position 142 is a position for zoom configuration 144. In zoom configuration 144, imaging system 102 has second field of view 112. In this configuration, one or more lenses in number of lenses 130 focuses light from primary lens 122 as the light passes through one or more lenses to sensor array 116 in a manner such that objects in image data 106 generated by sensor array 116 are magnified as compared to when light is not focused by number of lenses 130.

In other words, objects in the light that is magnified in zoom configuration 144 are larger, and more detail may be seen in the objects in image data 106 generated by sensor array 116. The greatest magnification occurs when sensor array 116 is as far as possible from number of lenses 130.

In particular, in zoom configuration 144, the light is focused for portion 146 of sensors 120 in sensor array 116.

Second field of view 112 is present for portion 146 of sensors 120. Other portions of sensors 120 may still have first field of view 110.

In these illustrative examples, movement system 128 also may move moveable lens array 126 in a direction that is transverse to optical axis 136. In other words, movement system 128 may move moveable lens array 126 from side to side or in other directions relative to a plane in which sensor array 116 is located. With this type of movement, movement system 128 may select number of portions 148 of sensors 120 in sensor array 116. This movement may be used to select which portions in number of portions 148 receive focused light from number of lenses 130 in moveable lens array 126. In other words, this movement may be used to select portion 114 or area 108 that should have second field of view 112. In one illustrative example, if area 108 is a city, movement system 128 may move moveable lens array 126 such that a particular building is shown in greater size using second field of view 112. Additionally, more detail about the building also may be seen in second field of view 112.

In these illustrative examples, image data 106 generated by sensor array 116 in imaging system 102 may be sent to processor unit 150. Processor unit 150 may be considered part of imaging system 102 or a separate component. Processor unit 150 may be part of a computer system, depending on the particular implementation.

Processor unit 150 may be, for example, without limitation, a number of processors, a multi-processor core, or some other suitable type of processor. As another example, processor unit 150 may be a heterogeneous processor system in which a main processor is present with secondary processors on a single chip. In yet another example, processor unit 150 may be a symmetric multi-processor system containing multiple processors of the same type. As yet another example, processor unit 150 may be implemented using an application specific integrated circuit (ASIC), a programmable logic device, a programmable logic array, a programmable array logic, a field programmable gate array, and other suitable types of hardware devices.

In this manner, lens system 118 in imaging system 102 may provide for more than one field of view using lenses that provide first field of view 110 and second field of view 112. In other words, both fields of view may be integrated in lens system 118. Lens system 118 may be located in housing 125. With lens system 118, the size, weight, and/or power needed to operate imaging system 102 may be less than that of currently used lens systems that provide for more than one field of view.

Figure 2:
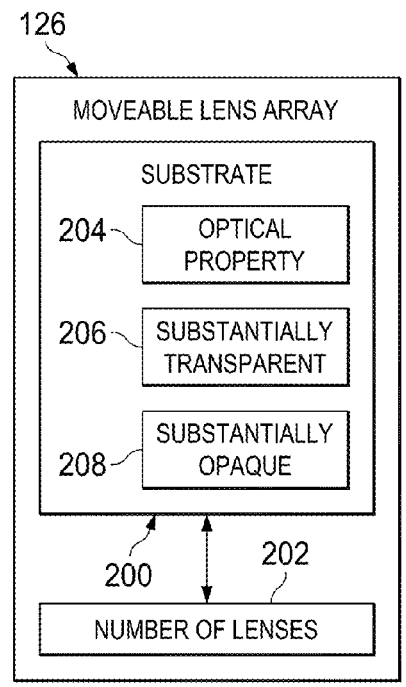
FIG. 2 is an illustration of a block diagram of components in a moveable lens array in accordance with an illustrative embodiment.

Turning now to FIG. 2, an illustration of a block diagram of components in a moveable lens array is depicted in accordance with an illustrative embodiment. As depicted, moveable lens array 126 comprises substrate 200 and number of lenses 202. In these illustrative examples, number of lenses 202 is associated with substrate 200. A lens in number of lenses 202 is configured to focus light passing through the lens. Depending on the distance of number of lenses 202 to a sensor array, light may be focused on the sensor array such that objects are magnified in the image data generated by the sensor array.

As depicted, substrate 200 may be substantially rigid or foldable, depending on the particular implementation. For example, substrate 200 may be comprised of a single piece. In other examples, substrate 200 may be comprised of multiple pieces that may fold with respect to each other.

Further, substrate 200 also may have optical property 204. Optical property 204 may change to allow different amounts of light to pass through substrate 200. For example, substrate 200 may be substantially transparent 206 when moveable lens array 126 is in first position 138 for normal configuration 140 in FIG. 1. In this position, number of lenses 202 does not cause magnification of light that reaches sensor array 116 in FIG. 1.

Substrate 200 may be substantially opaque 208 when moveable lens array 126 is in second position 142 for zoom configuration 144 in FIG. 1. In this state, light passes through number of lenses 202 but does not pass through substrate 200. In zoom configuration 144, light reaching sensor array 116 is focused on the sensor array. In this configuration, substrate 200 is substantially opaque 208 such that other light not focused by number of lenses 202 does not reach sensor array 116.

The illustration of imaging environment 100 and components of imaging system 102 in FIG. 1 and FIG. 2 is not meant to imply physical or architectural limitations to the manner in which illustrative embodiments may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although platform 104 in FIG. 1 has been described as a satellite in one illustrative embodiment, other illustrative embodiments may be applied to other types of platforms. For example, without limitation, other illustrative embodiments may be applied to a mobile platform, a stationary platform, a land-based structure, an aquatic-based structure, an airborne structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, a camera housing, an aircraft, an unmanned aerial vehicle, a person, or some other suitable type of platform.

Figure 3:
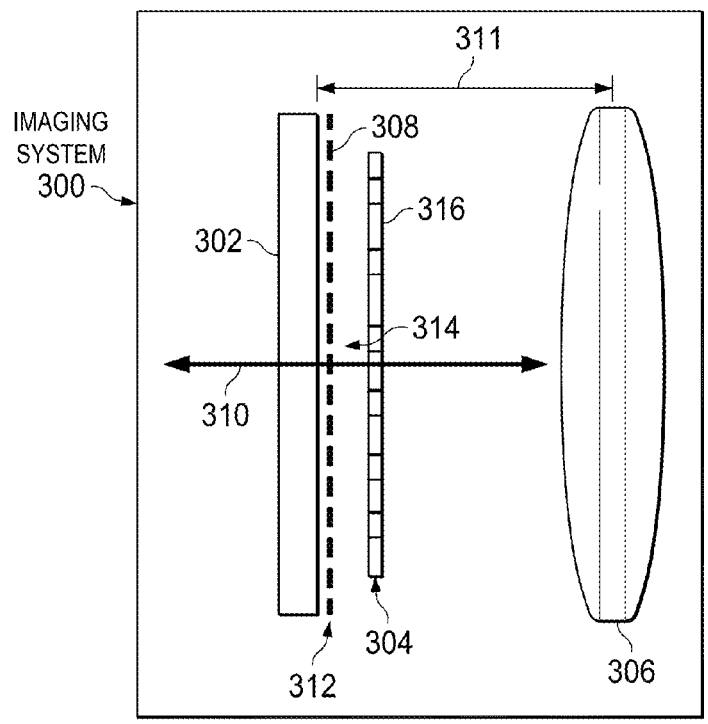
FIG. 3 is an illustration of an imaging system in a normal configuration in accordance with an illustrative embodiment.

Turning now to FIG. 3, an illustration of an imaging system in a normal configuration is depicted in accordance with an illustrative embodiment. This normal configuration may be one example of an implementation for normal configuration 140 shown in block form in FIG. 1. As depicted, imaging system 300 includes sensor array 302, moveable lens array 304, and primary lens 306.

In these illustrative examples, sensor array 302 may be moved farther away from primary lens 306 such that moveable lens array 304 may be placed between primary lens 306 and sensor array 302. Moveable lens array 304 reimages the image generated by primary lens 306 onto sensor array 302 to change the magnification of the image.

In this illustrative example, image plane 308 is fixed and does not move along optical axis 310. Moveable lens array 304 may move along optical axis 310 between sensor array 302 and primary lens 306. As depicted, distance 311 is present between sensor array 302 and primary lens 306.

When moveable lens array 304 is in first position 312, moveable lens array 304 is in a normal configuration. In this illustrative example, light passing through number of lenses 314 in moveable lens array 304 does not focus the light that reaches sensor array 302 to cause a magnification of objects in image data generated by sensor array 302. Further, substrate 316 is substantially transparent in first position 312. In other words, moveable lens array 304 is configured to pass light such that the light is not focused in a manner that changes the field of view provided by primary lens 306.

In this configuration, a first field of view is provided in imaging system 300. As depicted, primary lens 306 defines the first field of view in imaging system 300. This field of view may be referred to as a wide field of view in these illustrative examples.

Figure 4:
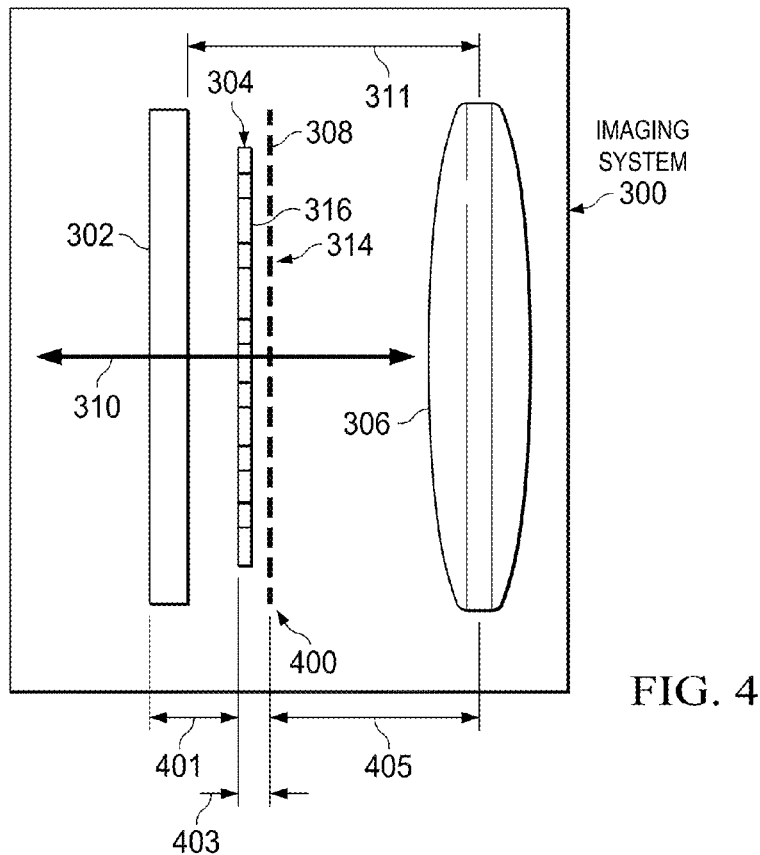
FIG. 4 is an illustration of an imaging system in a zoom configuration in accordance with an illustrative embodiment.

Turning now to FIG. 4, an illustration of an imaging system in a zoom configuration is depicted in accordance with an illustrative embodiment. This zoom configuration is an example of one implementation of zoom configuration 144 shown in block form in FIG. 1.

Moveable lens array 304 is in second position 400. In second position 400, moveable lens array 304 is in a zoom configuration. As depicted, moveable lens array 304 is located closer to image plane 308 than sensor array 302. In particular, moveable lens array 304 is substantially adjacent to image plane 308.

In these illustrative examples, distance 311 may be increased by moving sensor array 302, primary lens 306, or both sensor array 302 and primary lens 306. The change in distance 311 is such that image plane 308 is in a location such that moveable lens array 304 is able to reimage the image generated by primary lens 306 onto sensor array 302.

In these illustrative examples, moveable lens array 304 focuses the light in image plane 308 onto sensor array 302. In other words, moveable lens array 304 reimages the image generated by primary lens 306 on sensor array 302. Moveable lens array 304 takes the image generated by primary lens 306 and generates a new image on sensor array 302 with a different magnification.

The magnification is given by the ratio of distance 401 from sensor array 302 to moveable lens array 304 divided by distance 403 from moveable lens array 304 to image plane 308. Different magnifications may be obtained by varying distance 405 from primary lens 306 to image plane 308 and distance 403 from moveable lens array 304 to image plane 308.

In this configuration, light passing through number of lenses 314 is focused such that the light reaching sensor array 302 magnifies objects in the image data generated by sensor array 302. Further, substrate 316 is substantially opaque in this configuration. By being substantially opaque, light passing through number of lenses 314 in moveable lens array 304 reach sensor array 302, while light does not pass through substrate 316. As a result, light that is not focused by number of lenses 314 does not reach sensor array 302. This zoom configuration provides a second field of view. This second field of view may be referred to as a narrow field of view. This narrow field of view is narrower than the wide field of view.

Figure 5:
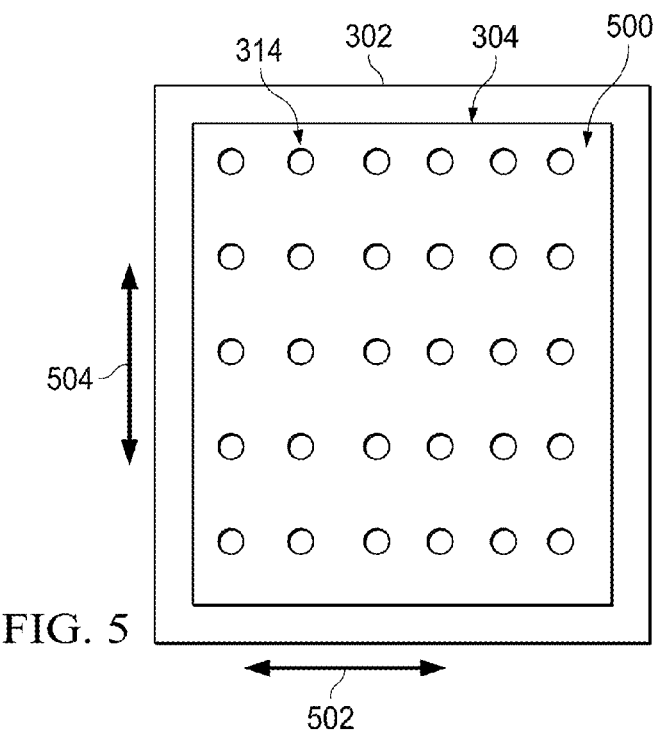
FIG. 5 is an illustration of a moveable lens array in accordance with an illustrative embodiment.

Turning now to FIG. 5, an illustration of a moveable lens array is depicted in accordance with an illustrative embodiment. In this illustrative example, a plane view of moveable lens array 304 is depicted. As can be seen, number of lenses 314 is arranged in an array in substrate 500.

In these illustrative examples, each lens in number of lenses 314 may focus light for providing a second field of view that is narrower than a first field of view. In other words, multiple second fields of view may be provided by number of lenses 314 for multiple portions of sensor array 302. The image data generated for these multiple fields of view may be processed to select image data for areas in which enlargement of objects for greater detail is desired.

Further, moveable lens array 304 also may be moved in the direction of arrow 502, the direction of arrow 504, or some combination thereof. Movement in the direction of arrow 502 and arrow 504 is transverse to optical axis 310 as depicted in FIG. 3 and FIG. 4. This movement of moveable lens array 304 may require refocusing of the image with primary lens 306 in FIG. 3. The movement of moveable lens array 304 in the direction of arrow 502, arrow 504, or both may be used to select a portion of sensor array 302 through which light is focused by number of lenses 314.

The portion of sensor array 302 selected may receive light that is not focused when moveable lens array 304 is in a normal configuration. This portion of sensor array 302 may generate image data including an object of interest. If an enlargement of the object of interest is desired, moveable lens array 304 may be moved into a zoom configuration with a lens in moveable lens array 304 being located over a portion of sensor array 302 that is generating image data over the object of interest. In this manner, light may be focused to reach the sensor array such that the object in the image data is magnified and more detail about the object may be present.

The illustration of imaging system 300 in FIGS. 3-5 are not meant to imply limitations to the manner in which an illustrative embodiment may be implemented. Other illustrative embodiments may include other components in addition to or in place of the ones depicted. For example, substrate 316 may be a foldable substrate. In other words, substrate 316 may fold such that moveable lens array 304 is not located between sensor array 302 and primary lens 306. In still other illustrative examples, moveable lens array 304 may be moved entirely out of the area in which light passes through primary lens 306 to reach sensor array 302. Further, the magnification may be an increase in magnification or a decrease in magnification.

In the illustrative examples, the second field of view may be provided more quickly using moveable lens array 304 as compared to currently used lens systems. The size and weight of moveable lens array 304 may aid in allowing for faster movement in providing changes in the field of view. Also, less power may be needed because of the reduction in weight achieved by using moveable lens array 304.

Figure 6:
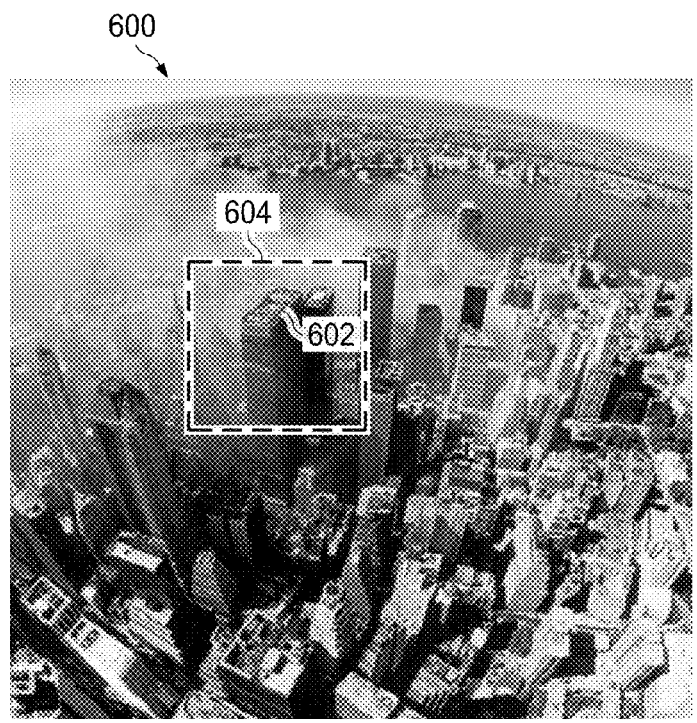
FIG. 6 is an illustration of an image with a first field of view in accordance with an illustrative embodiment.

Turning now to FIG. 6, an illustration of an image with a first field of view is depicted in accordance with an illustrative embodiment. In this depicted example, image 600 is an example of an image generated by sensor array 302 in FIG. 3 with a first field of view. Image 600 includes object of interest 602 in area 604 of image 600. A lens in moveable lens array 304 in FIG. 3 may be moved over the portion of a sensor array generating image data for object of interest 602 in area 604 of image 600.

Figure 7:
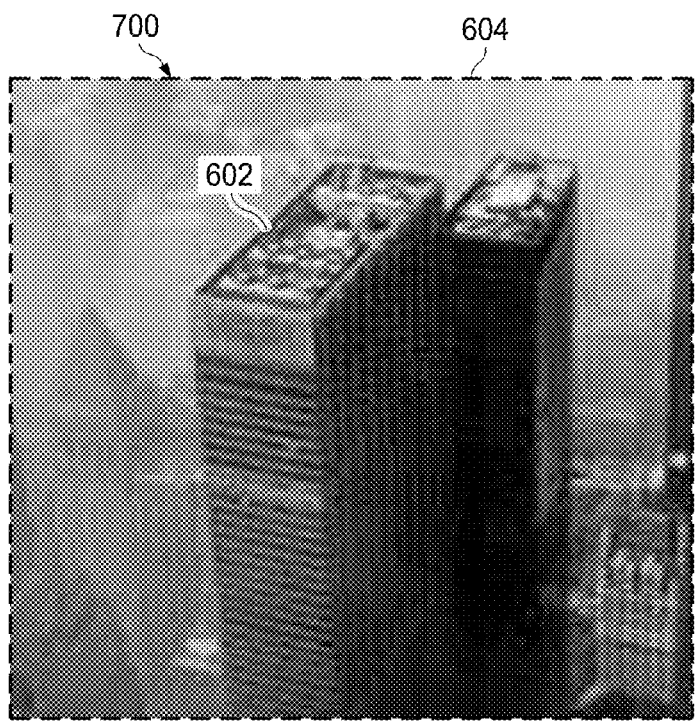
FIG. 7 is an illustration of an image in a second field of view in accordance with an illustrative embodiment.

Turning now to FIG. 7, an illustration of an image in a second field of view is depicted in accordance with an illustrative embodiment. In this example, image 700 is an image generated with a second field of view by sensor array 302 through light focused by moveable lens array 304 in FIG. 3.

In this depicted example, image 700 is generated by image data in a second field of view. Image 700 is a magnified view of area 604 of image 600 in FIG. 6. In this example, object of interest 602 is magnified, and additional features of image 600 not seen in image 600 may be present in image 700. The magnified view in image 700 may be generated by moving moveable lens array 304 such that a lens in moveable lens array 304 moves over the portion of the sensor array that generates area 604 of image 600 with object of interest 602. As a result, the focused light causes image data to be generated by that portion of sensor array 302 for image 700.

In these illustrative examples, each lens in number of lenses 314 in FIG. 3 may focus light for a portion of sensor array 302. By moving moveable lens array 304, different portions of sensor array 302 may be provided with a second field of view in which objects are magnified and may have greater detail.

The illustrations of image 600 in FIG. 6 and image 700 in FIG. 7 are only examples of images that may be generated by an imaging system, such as imaging system 102 in FIG. 1. In other examples, the area magnified may be of a different size. In still other examples, when moveable lens array 304 has more than one lens in number of lenses 314, additional images similar to image 700 may be generated for many areas in image 600.

Figure 8:
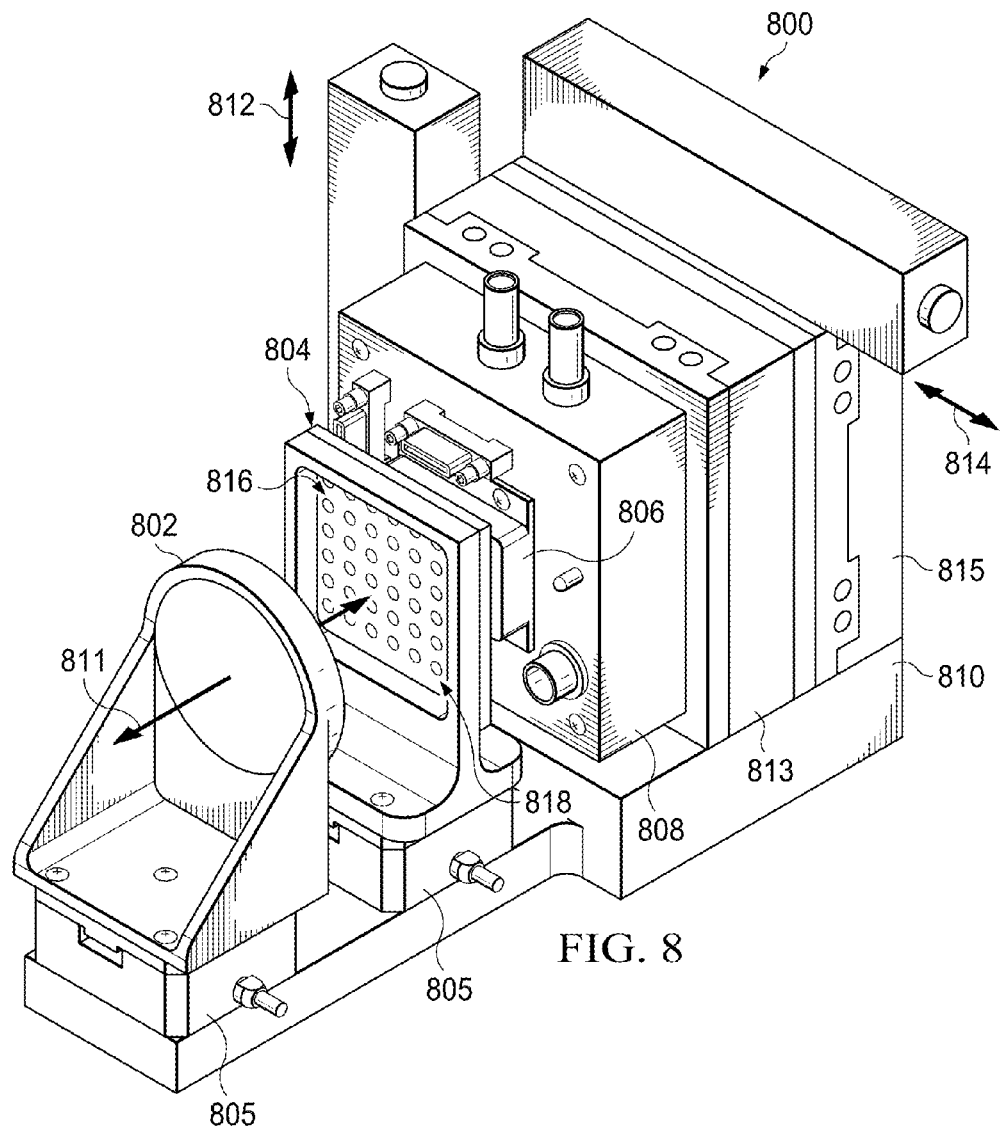
FIG. 8 is an illustration of an imaging system in accordance with an illustrative embodiment.

With reference next to FIG. 8, an illustration of an imaging system is depicted in accordance with an illustrative embodiment. In this illustrative example, imaging system 800 is an example of one physical implementation of imaging system 102 shown in block form in FIG. 1.

As depicted, imaging system 800 includes primary lens 802, moveable lens array 804, sensor array 806, and processor unit 808. These components are associated with platform 810. Primary lens 802 and moveable lens array 804 may be moved by translation stages 805 in a direction along optical axis 811. Primary lens 802 and moveable lens array 804 also may be moved by vertical translation unit 813 in the direction of arrow 812. Sensor array 806 may be moved by horizontal translation unit 815 in the direction of arrow 814. Using these translation units, primary lens 802 or sensor array 806 may be moved laterally. In other examples, translation stages 805, vertical translation unit 813, and horizontal translation unit 815 allow the embodiments to move in three-dimensional space.

In this illustrative example, moveable lens array 804 comprises lenses 816 and substrate 818. Lenses 816 are arranged in a grid in these illustrative examples. Substrate 818 has an optical property that allows substrate 818 to be either substantially opaque or substantially transparent. Substrate 818 is substantially opaque when moveable lens array 804 is moved to provide a magnification of light reaching sensor array 806. Substrate 818 is substantially transparent when moveable lens array 804 is not used to provide a magnification of light reaching sensor array 806.

The illustration of imaging system 800 is only provided as an example of one implementation of imaging system 102 shown in block form in FIG. 1 and is not meant to imply physical or architectural limitations to the manner in which an imaging system may be implemented. For example, sensor array 806 may not move, and moveable lens array 804 may also move in the direction of arrow 812.

The different components shown in this figure may be combined with components in FIG. 1 and FIG. 2, used with components in FIG. 1 and FIG. 2, or a combination of the two. Additionally, some of the components in this figure may be illustrative examples of how components shown in block form in FIG. 1 and FIG. 2 can be implemented as physical structures.

Figure 9:
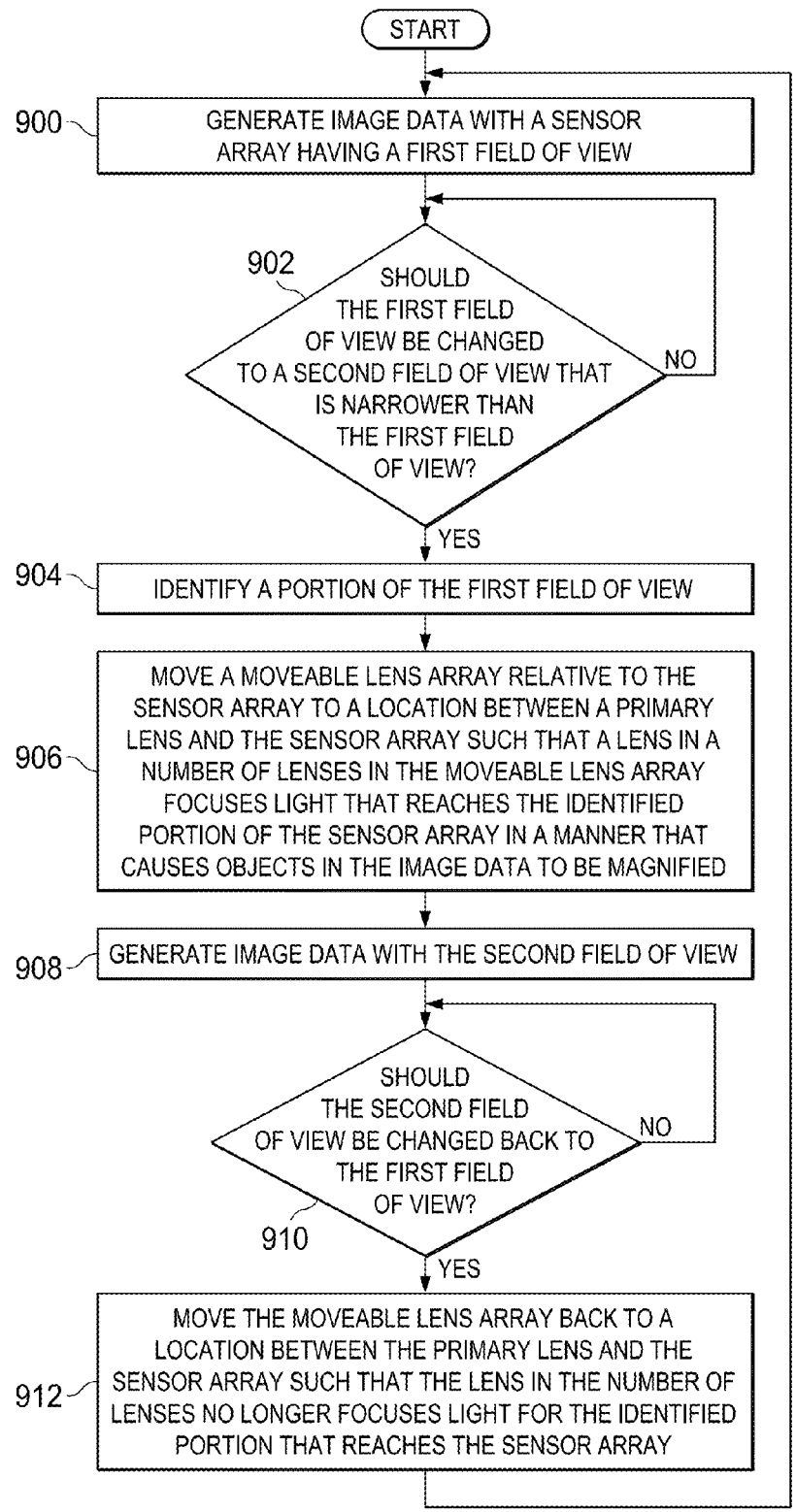
FIG. 9 is an illustration of a flowchart of a process for generating images in accordance with an illustrative embodiment.

Turning now to FIG. 9, an illustration of a flowchart of a process for generating images is depicted in accordance with an illustrative embodiment. The process illustrated in FIG. 9 may be implemented in imaging environment 100 in FIG. 1. In particular, this process may be implemented using imaging system 102 in FIG. 1.

The process begins by generating image data with a sensor array having a first field of view (operation 900). This first field of view may be defined by a primary lens in the imaging system. The first field of view may be a wide field of view in these illustrative examples. A determination is made as to whether the first field of view should be changed to a second field of view that is narrower than the first field of view (operation 902). If the first field of view should be changed, a portion of the first field of view is identified (operation 904). This portion is a portion for which a magnification of objects is desired.

The process moves a moveable lens array relative to the sensor array to a location between a primary lens and the sensor array such that a lens in a number of lenses in the moveable lens array focuses light that reaches the identified portion of the sensor array in a manner that causes objects in the image data to be magnified (operation 906). The light reaching the sensor array generates image data with the second field of view (operation 908). This second field of view may be a narrow field of view that is narrower than the wide field of view.

A determination is made as to whether the second field of view should be changed back to the first field of view (operation 910). If the second field of view should be changed back to the first field of view, the moveable lens array is moved back to a location between the primary lens and the sensor array such that the lens in the number of lenses no longer focuses light for the identified portion that reaches the sensor array (operation 912), with the process then returning to operation 900.

With reference again to operation 910, if the second field of view should not be changed back to the first field of view, the process returns to operation 910. Turning back to operation 902, if the first field of view should not be changed to the second field of view, the process returns to operation 902.

Figure 10:
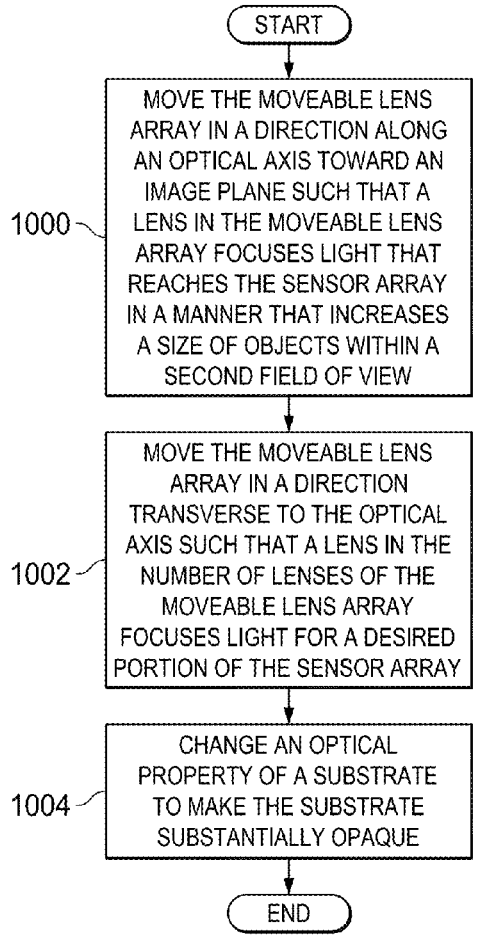
FIG. 10 is an illustration of a flowchart of a process for changing a first field of view to a second field of view in accordance with an illustrative embodiment.

Turning now to FIG. 10, an illustration of a flowchart of a process for changing a first field of view to a second field of view is depicted in accordance with an illustrative embodiment. The process illustrated in FIG. 10 is an example of an implementation for operation 906 in FIG. 9.

The process begins by moving the moveable lens array in a direction along an optical axis toward an image plane such that a lens in the number of lenses in the moveable lens array focuses light that reaches the sensor array in a manner that increases a size of objects within a second field of view (operation 1000). The location of the primary lens may also be changed to maintain a desired focus. For example, at least two of the primary lens, the moveable lens array, and the sensor array may move to maintain a desired focus when the zoom changes. The amount of magnification or increase in size of the objects may depend on the location of the sensor array with respect to the moveable lens array relating to the focal length of the number of lenses in the moveable lens array.

The moveable lens array also is moved in a direction transverse to the optical axis such that a lens in the number of lenses of the moveable lens array focuses light for a desired portion of the sensor array (operation 1002). In operation 1002, the desired portion is a portion in which one or more objects for which magnification is desired is present. In these illustrative examples, the portion selected is a portion of the sensor array that receives light in a first field of view that includes one or more objects for which magnification is desired in a second field of view. The process changes an optical property of a substrate to make the substrate substantially opaque (operation 1004), with the process terminating thereafter.

Figure 11:
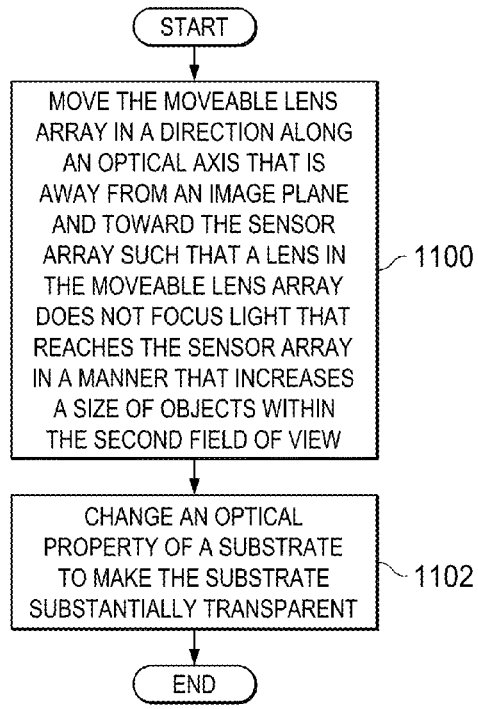
FIG. 11 is an illustration of a flowchart of a process for changing a second field of view to a first field of view in accordance with an illustrative embodiment.

Turning now to FIG. 11, an illustration of a flowchart of a process for changing a second field of view to a first field of view is depicted in accordance with an illustrative embodiment. The process illustrated in FIG. 11 is an example of an implementation for operation 912 in FIG. 9.

The process begins by moving the moveable lens array in a direction along an optical axis that is away from an image plane and toward the sensor array such that a lens in the moveable lens array does not focus light that reaches the sensor array in a manner that increases a size of objects within the second field of view (operation 1100). The process changes an optical property of a substrate to make the substrate substantially transparent (operation 1102), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1000, operation 1002, and operation 1004 in FIG. 10 may be performed in several different orders or at substantially the same time. As another example, in FIG. 11, operations 1100 and 1102 may be performed in reverse order or at substantially the same time. In another illustrative example, an operation changing the distance between the primary lens and the sensor array may be included to take into account that the moveable lens array is used to change magnification of the image by reimaging the image generated by the moveable lens array.

Thus, the illustrative embodiments provide a method and apparatus for changing fields of view for an imaging system. In the illustrative embodiments, the field of view may be changed through using a single lens system. The single lens system may be in the same housing.

In the lens system, a primary lens is configured to provide a first field of view. A moveable lens array is configured to provide a second field of view when in a zoom configuration. In this zoom configuration, the moveable lens array magnifies light passing through one or more lenses in the moveable lens array in a manner such that objects are enlarged in the image data generated by the sensor array as compared to those objects in the first field of view. The moveable lens array may move to a normal configuration in which the moveable lens array does not magnify light passing through the primary lens such that the first field of view is provided.

With this integrated lens system, fewer components may be used in an imaging system to provide desired fields of view. Further, in other illustrative embodiments, one or more additional fields of view may be provided in addition to the first field of view and the second field of view. These additional fields of view may be provided through the use of additional moveable lens arrays and/or changing the magnification as compared to the moveable lens array providing the second field of view.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a sensor array comprising sensors arranged in an array in which the sensors are configured to generate image data;
    a primary lens configured to direct light towards the sensor array; and
    a moveable lens array comprising:
        a number of lenses, the moveable lens array being moveable to a plurality of positions between the primary lens and the sensor array, and each lens in the number of lenses is configured to focus the light, a first position in the plurality of positions being a normal configuration, and a second position in the plurality of positions being a zoom configuration;
        a substrate, such that the number of lenses is associated with the substrate, the substrate being transparent when the moveable lens array is in the first position and opaque when the moveable lens array is in the second position.

2. The apparatus of claim 1, wherein a number of other positions in the plurality of positions is a number of positions of the moveable lens array over a number of portions of the sensor array.

3. The apparatus of claim 1 further comprising:
    a movement system connected to the moveable lens array and configured to move the moveable lens array to the plurality of positions.

4. The apparatus of claim 3, wherein the movement system is configured to move the moveable lens array along an optical axis.

5. The apparatus of claim 4, wherein the movement system is configured to move the moveable lens array to a position relative to an image plane in a direction transverse to the optical axis such that the light reaching a portion of the sensors is focused by the moveable lens array.

6. The apparatus of claim 4, wherein the movement system is configured to move the moveable lens array to a position relative to an image plane such that the light reaching a portion of the sensors is not focused by the moveable lens array.

7. The apparatus of claim 4, wherein the movement system is configured to move the moveable lens array to a position relative to the sensor array such that the moveable lens array focuses the light for a portion of the sensor array.

8. An imaging system comprising:
    a sensor array comprising sensors arranged in an array in which the sensors are configured to generate image data;
    a primary lens configured to direct light towards the sensor array;
    a moveable lens array comprising a number of lenses, wherein the moveable lens array is moveable between the primary lens and the sensor array and each lens in the number of lenses is configured to focus the light; and
    a movement system connected to the moveable lens array and configured to move the moveable lens array to a first position along an optical axis relative to an image plane such that the light reaching a portion of the sensors is not focused by the moveable lens array and a second position along the optical axis relative to the image plane such that the light reaching the portion of the sensors is focused by the moveable lens array and move the moveable lens array to a number of positions in a direction transverse to the optical axis of the sensor array.

9. The imaging system of claim 8, wherein the moveable lens array further comprises:
   a substrate, wherein the number of lenses is associated with the substrate.

10. The imaging system of claim 9, wherein the substrate is configured to be substantially transparent when the moveable lens array is in the first position and substantially opaque when the moveable lens array is in the second position.

11. A method for managing light reaching a sensor array, the method comprising:
   identifying a portion of a first field of view; and
   moving a moveable lens array relative to the sensor array to a location between a primary lens and the sensor array such that a lens in the moveable lens array focuses the light for the first field of view to form a second field of view, such that the moveable lens array moves along an optical axis toward an image plane such that the moveable lens array focuses the light for the first field of view to form the second field of view, such that a number of lenses in the moveable lens array is associated with a substrate, the substrate being opaque when the moveable lens array is positioned relative to the image plane such that the moveable lens array does not focus the light for the first field of view to form the second field of view.

12. The method of claim 11 further comprising:
   moving the moveable lens array along the optical axis away from the image plane such that the moveable lens array does not focus the light for the first field of view to form the second field of view.

13. The method of claim 11 further comprising:
   moving the moveable lens array in a direction transverse to the optical axis such that the lens in the moveable lens array focuses the light over a portion of the sensor array for the second field of view.

14. The method of claim 11, wherein the substrate is transparent when the moveable lens array is positioned relative to the image plane such that the moveable lens array focuses the light for the first field of view to form the second field of view.

* * * * *